H. O. KING.
SHAFT EXTENSION FOR AUTOMOBILE TRANSMISSION GEARING.
APPLICATION FILED NOV. 7, 1917.

1,300,174. Patented Apr. 8, 1919.

Witnesses:

Inventor:
Harry O. King,
By W. E. Williams
Atty.

UNITED STATES PATENT OFFICE.

HARRY ORLAND KING, OF CHICAGO, ILLINOIS.

SHAFT EXTENSION FOR AUTOMOBILE TRANSMISSION-GEARING.

1,300,174. Specification of Letters Patent. Patented Apr. 8, 1919.

Application filed November 7, 1917. Serial No. 200,707.

*To all whom it may concern:*

Be it known that I, HARRY ORLAND KING, a citizen of the United States, residing at Chicago, county of Cook, and State of Illinois, have invented a new and useful Improvement in Shaft Extensions for Automobile Transmission-Gearing, of which the following is a specification.

My invention relates to devices that are chiefly used in connection with converting automobile pleasure car rigs into truck rigs, and has for its object to provide an extension on the end of the transmission gear box which will aid in converting a Ford chassis into a truck chassis, and is most desirable when the converting rig is to be used with what is known as an internal gear rear drive.

The ordinary pleasure vehicle is designed primarily to take care of only the strains that are encountered in the use of the pleasure car only, and are not made to provide against the extra service that sometimes develops in the conversion to the commercial rig.

When an internal gear drive is used for the rear axle of a truck rig, it is customary to use a shaft drive involving two universal joints, and in this case greater whipping action is encountered in the shaft transmission, and more severe shocks are put upon the bearing of the drive shaft as it emerges from the gear casing.

When a Ford pleasure rig, or other similar rig, is converted into a truck rig having the driving axle of the internal gear type the shocks and strains involved upon the journal of the drive shaft where it comes out of the gear casing or gear box, are so severe as to put undue load or loads upon these parts.

In order to accommodate for this extra service I provide an extension on the end of the gear casing in which I arrange an anti-friction bearing of sufficient strength to easily perform the service required in a truck rig. The invention is set forth in the claims.

Figure 1:
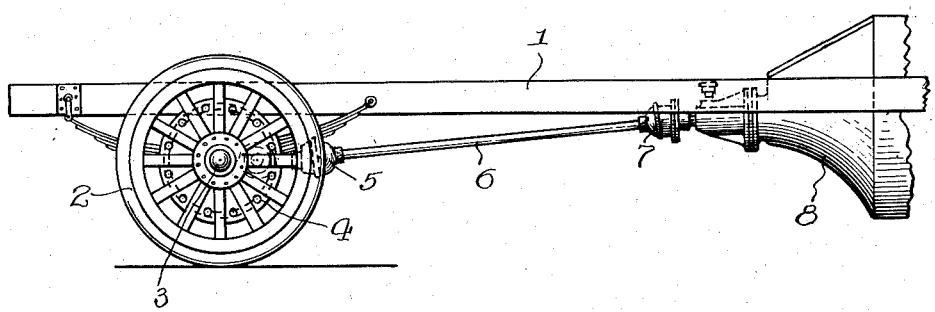
Figure 2:
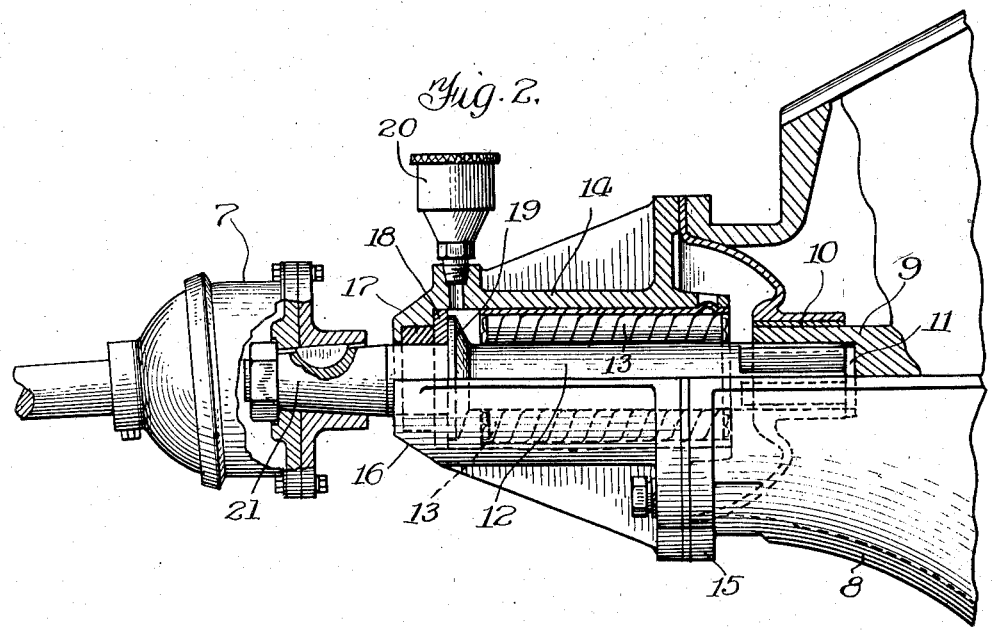

Reference will be had to the accompanying drawings, in which Figure 1 is a side elevation of a part of a truck chassis, illustrating the parts involved in my invention. Fig. 2 is a vertical sectional elevation on an enlarged scale with parts in section showing only my extension.

In the drawing, 1 indicates the ordinary frame of a chassis. 2 indicates the rear or drive wheels. 3 is the rear axle; 4 the internal gearing mechanism in general outline. 5 indicates the rear universal. 6 indicates the drive shaft. 7 indicates the front universal.

8 indicates the ordinary gear casing of a Ford car, and 9 the driving shaft as it emerges from the gear casing 8. 10 indicates the bushing or normal end bearing of the drive shaft of a Ford car as it comes out of the gear casing. In the end of the shaft 9 there is the ordinary socket 11 which normally engages the driving member of the universal as ordinarily used in the pleasure car assembly. Into this socket 11 I insert the end of an extension shaft 12 which is journaled with an anti-friction roller journal 13 into the housing casing 14 secured normally to the end flanges 15 of the rig pleasure car gear casing.

In the end 16 of the casing 14 is arranged the sealing washer 17 in connection with the end thrust plate 18 which bears against a flange 19 of my shaft 12 which takes the end thrust of the shaft. For lubrication purposes I provide the oil or grease cup 20 adapted to discharge lubricant into the cavity of the journal box for the shaft 12. On the end 21 of the shaft 12 I provide an ordinary universal 7 as before indicated.

What I claim is:

1. A gear casing containing a main shaft and bearing therefor in combination with a journal bearing attached to the gear casing, an extension shaft journaled in the said journal bearing and connected with the main shaft, and a thrust bearing associated with said journal bearing coöperating with a thrust element in said extension shaft.

2. A gear casing containing a main shaft and bearing therefor in combination with a journal bearing attached to the gear casing and provided with antifriction roller devices, an extension shaft journaled in the said journal bearing and connected with the main shaft and a thrust bearing associated with said journal bearing.

In witness whereof I have hereto signed my name this 2nd day of November, 1917, in the presence of two subscribing witnesses.

HARRY ORLAND KING.

Witnesses:
ALBERT J. LAUSER,
G. W. HAULENBEEK.